United States Patent [19]

Barbaric et al.

[11] Patent Number: 4,560,882
[45] Date of Patent: Dec. 24, 1985

[54] HIGH-EFFICIENCY X-RADIATION CONVERTERS

[75] Inventors: Zoran L. Barbaric, Malibu; Robert S. Nelson, Santa Monica, both of Calif.

[73] Assignee: Regents of the University of California, Berkeley, Calif.

[21] Appl. No.: 645,855

[22] Filed: Aug. 31, 1984

[51] Int. Cl.[4] ............................................. G01N 21/64
[52] U.S. Cl. ................................ 250/487.1; 250/483.1
[58] Field of Search ............... 250/483.1, 486.1, 487.1, 250/488.1

[56] References Cited

U.S. PATENT DOCUMENTS

| 3,041,456 | 6/1962 | MacLeod | 250/486.1 |
| 3,643,092 | 2/1972 | Van der Feyst | 250/486.1 |
| 3,936,645 | 2/1976 | Iversen | 250/486.1 |

Primary Examiner—James R. Hoffman
Attorney, Agent, or Firm—Poms, Smith, Lande & Rose

[57] ABSTRACT

An apparatus for efficient X-ray conversion. A phosphorescent crystal element which is sensitive to X-radiation, is coated with a reflective substance on all its faces except one. X-rays impinging upon a single element, or on an array of said elements in which the uncoated faces contiguously form an emitting surface, cause the phosphorescence to be internally reflected by the coating and to be emitted from only the uncoated face, where it can be used to activate a photodetector.

20 Claims, 10 Drawing Figures

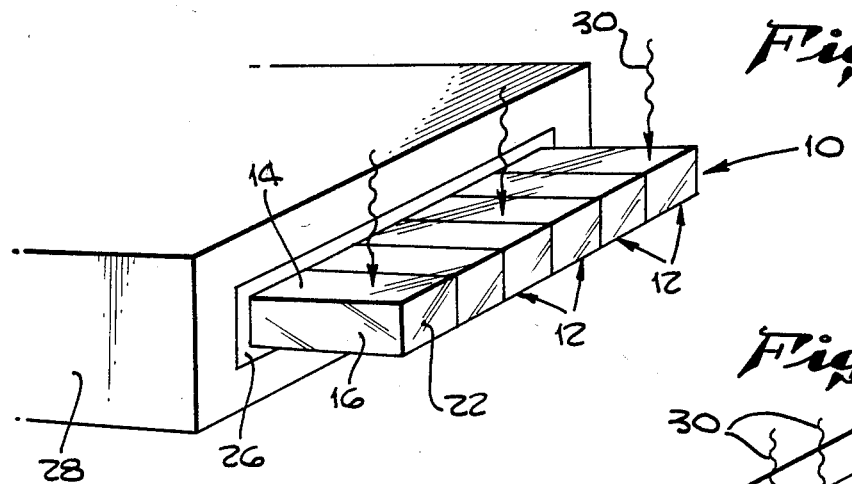
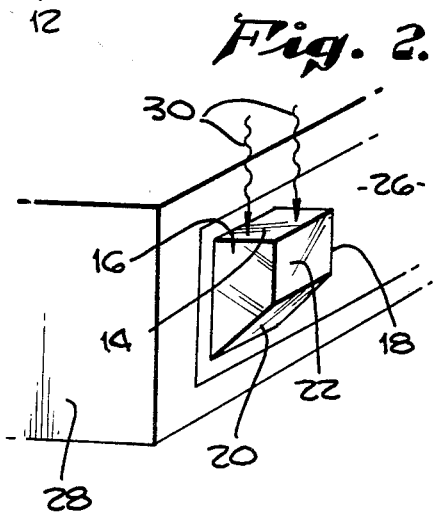
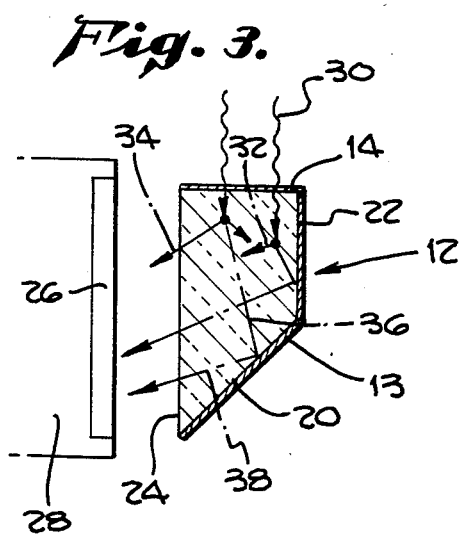
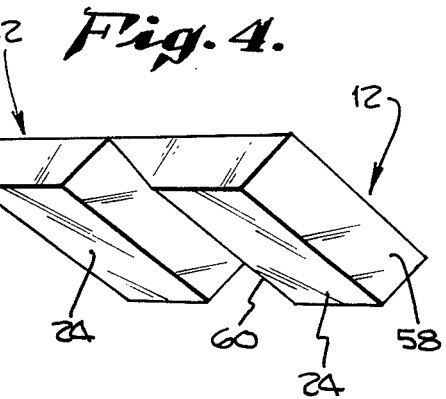
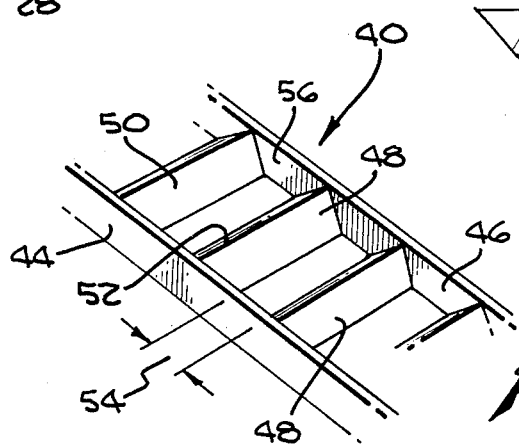

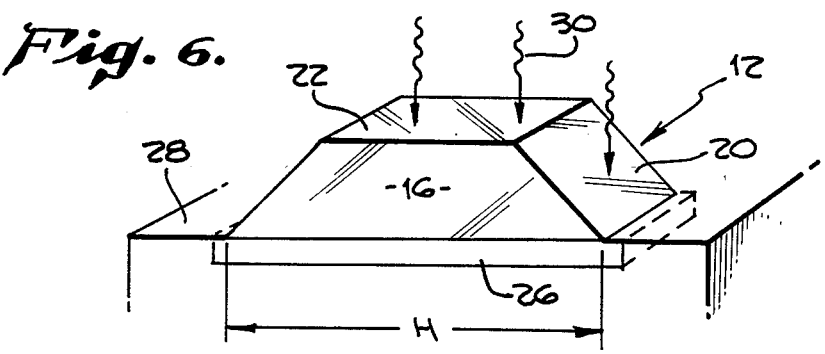
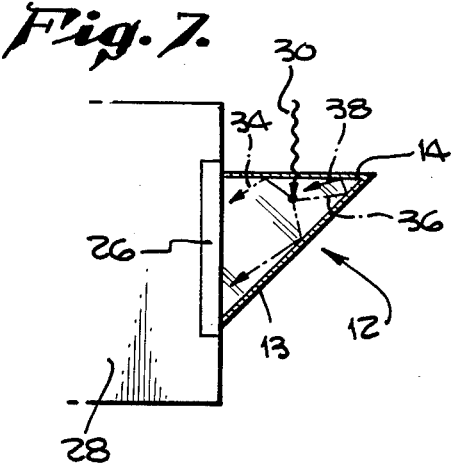
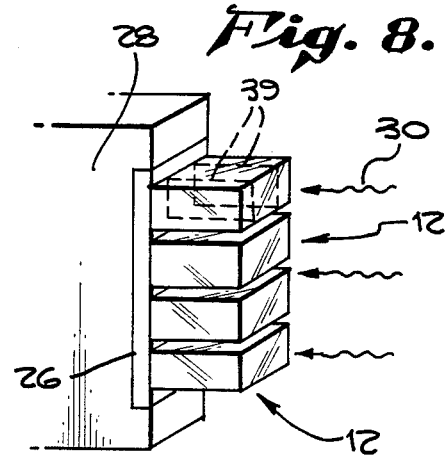
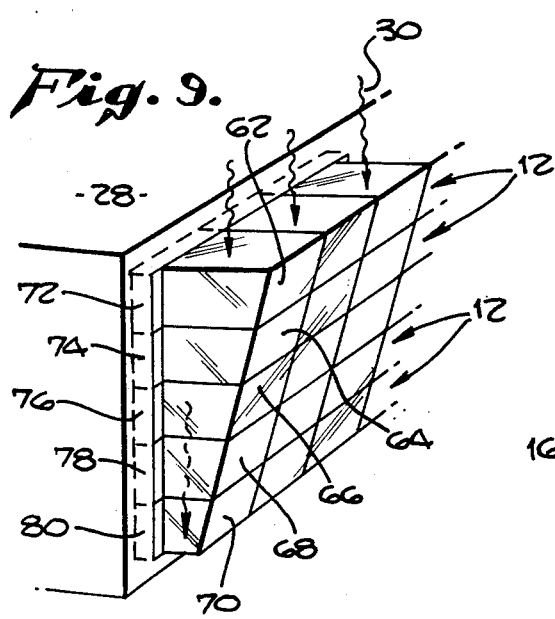
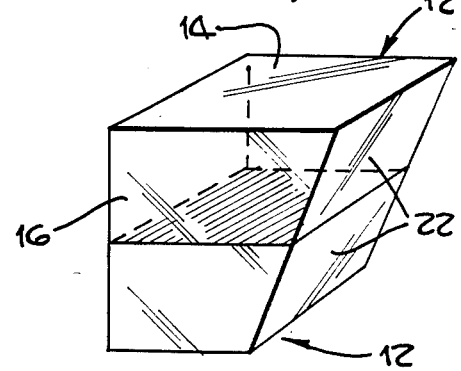

HIGH-EFFICIENCY X-RADIATION CONVERTERS

FIELD OF THE INVENTION

In general, the present invention relates to conversion of X-rays into visible radiation, and, in particular to faceted crystalline phosphors which effect internal reflection of the phosphorescence produced by incident X-radiation.

BACKGROUND OF THE INVENTION

In the field of X-ray detection, it has been a long standing goal of practitioners to improve upon the images which can be created by "reading" the X-rays projected through the target being scrutinized. The basic aim is to increase the image resolution while at the same time to decrease the amount of X-radiation which has to be passed through the target. This is especially important in medical applications, where prolonged exposure to X-radiation will inflict damage to the tissues which it penetrates. The current revolution in digital processing has afforded techniques for effectively and efficiently using computers to create better X-ray images.

Currently, it is known in the art to use "intensifying screens" to begin the conversion of the X-radiation passing through the target into a form of information suitable for analysis. Such screens are commonly made of a material which will scintillate visible wavelength radiation upon being bombarded by X-radiation. For each X-ray photon striking the material, a larger number of light photons are created. This, in effect, establishes a very basic X-ray conversion and amplifier mechanism.

While such intensifying screens do act to reduce the radiation risk to which a patient or X-ray source operator is exposed by reducing the dosage required to obtain an acceptable X-ray image, such screens have an inherent effect on the resolution achieved in the final image. The visible light photons produced in a screen emanate from the bombardment-conversion event in random directions, exiting the screen in directions other than that of the incident X-ray which produced the visible wavelength photons. In other words, a "scatter effect" is produced which degrades the final image.

Recent patents have suggested different approaches to the construction of such screens in order to improve their performance and thereby produce more acceptable final images. U.S. Pat. Nos. 3,041,456 and 3,643,092, and 3,936,645, each offer cellularized-type screens which partially intensify the radiation to be converted to a usable data format. These known structures use devices to limit the paths taken by the visible photons produced in order to reduce the scattered luminescent radiation diffusing from the screen. Although these intensifying screens reduce the inherent scattering effect of the visible radiation produced by the impinging X-radiation, a certain quantity of the effect remains and, therefore, still affects the resolution of the final image produced.

Therefore, it is a primary object of the present invention to improve images created by X-radiology techniques.

Another object of the present invention is to efficiently convert X-radiation to visible radiation.

It is another object of the present invention to utilize the large number of light photons created in X-radiation sensitive phosphorescent crystals by each striking X-ray photon irregardless of its initial angle of projection when created.

It is a further object of the present invention to reduce patient dosage of X-rays in a medical environment.

SUMMARY OF THE INVENTION

The present invention, in a broad aspect, is a crystalline phosphorescent element, which is sensitive to X-radiation, and which is coated with a visible radiation reflective substance on all faces of each element except one face. X-rays impinging upon the element, cause phosphorescent scintillations which are internally reflected by the reflective coating and directed toward and emitted from the uncoated face. Such visible radiation can then be scanned using conventional photodetector techniques.

In accordance with one feature of the invention, various element shapes and muliple element arrays can be structured and ordered to achieve one dimensional and two dimensional information transmitting arrays.

In accordance with another feature of the invention, conventional photodectors such as film, photodiode, CCD solid state detectors, photoconductive sensors, and photoemissive sensors may be employed in conjunction with the phosphorescent element. The data extracted from these photodetectors can then be conventionally analyzed by converting the received visible radiation into a digital information format for storage and imaging.

Other objects, features, and advantages of the invention will become apparent upon consideration of the following detailed description and the accompanying drawings.

BRIEF DESCRIPTION OF THE DRAWINGS

FIG. 1 is a perspective view of crystalline phosphorescent elements of the present invention, according to when disposed in a linear array adapted for use with a photodetector;

FIG. 2 is a perspective view of an alternate embodiment of the phosphorescent element of FIG. 1;

FIG. 3 is a detailed view, partially in cross section of the element of FIG. 2;

FIG. 4 is a perspective view of another alternative embodiment of the phosphorescent elements of FIG. 1;

FIG. 5 is a perspective view of a vapor-deposit or grannular phosphor forming mold for producing the elements shown in FIG. 4;

FIG. 6 is a perspective view of the elements of FIG. 4 as adapted for use with a photodetector;

FIG. 7 is a plan view of an alternate embodiment of an element similar to that shown in FIG. 3;

FIG. 8 is a perspective view of another alternative embodiment of the present invention;

FIG. 9 is a perspective view of another embodiment of the present invention; and FIG. 10 is a perspective view of a portion of the embodiment shown in FIG. 9.

DETAILED DESCRIPTION

The basic structure and principle of the present invention is best understood with reference to FIGS. 1, 2, 3, and 7. The apparatus 10 for converting X-radiation to visible radiation is shown as a linear series of crystalline elements 12. Each element 12 is constructed of an X-ray sensitive phosphorous, crystalline substance which has been cut or cleaved or molded to provide the desired X-ray stopping power—attenuation caused by the atomic structure of the element—and spatial resolution capability. Top face 14, side faces 16 and 18, bottom face 20, and end face 22, of each crystalline element 12 has been coated with a wafer thin, visible wavelength radiation reflective coating, or film, 13 which is transparent to X-radiation. Where each element 12 of the linear array of FIG. 1 has its side face 18 abutting side face 16 of the adjacent element 12, each face is nonetheless so coated. The reflective coating presents its polish toward the center of each element 12. Emitting face 24 of each element 12 has been left uncoated. Uncoated face 24 abuts, or is in close communicative proximity to, the photo-sensitive surface 26 of a conventional photodectector 28, such as the RETICON (TM) S-series photodiode array, manufactured by EG&G Reticon Corporation.

The substance used to create the reflective coating 13 on elements 12 can be selected from those commercially available. For one example, the reflective coating can be of aluminum or silver which can be vapor-deposited on the external faces of the elements as would be done for any highly reflective mirror. Alternatively, elements 12 can be coated with a material having a low index of refraction, such as magnesium fluoride. Visible radiation photons striking such a coating 13 on face 14, 16, 18, 20 or 22 at any angle greater than the critical angle would be subject to the total internal reflection property of the material. To reduce absorption losses within the element 12, a combination of a low index of refraction material and a highly reflective film could be employed as a coating 13. Multilayer, thin film dielectric reflective coatings may be used as well.

In FIG. 1, X-rays 30 passing through the target (not shown) impinge upon and penetrate top face 14 of apparatus 10. As the reflecting film 13 is transparent to X-rays, the X-rays 30 enter the crystalline elements 12. The impinging X-radiation causes the crystalline elements 12 to scintillate, creating numerous visible radiation photons for each penetrating X-radiation photon which causes a scintillation event.

As best seen in FIGS. 3 and 7, the visible radiation photons emanate in various paths through the crystalline element (as indicated by the straight arrows). Some visible radiation photons would take paths, such as indicated by arrows 32 and 34, which would have them pass directly through uncoated emitting face 24, whereupon they will strike photodetector face 26. Other visible radiation photons will take paths which will not allow them to hit the photodetector. On such a path, as shown for example by arrow 36, the visible radiation photon will strike bottom face 20 of element 12 having the polished reflective surface coating 13. Therefore, photons on paths other than those which take them directly through uncoated face 24 to surface 26 will be reflected by the reflector material coating 13 onto a new path, such as shown by arrow 38, which will cause them to pass nonetheless through emitting face 24 and to strike the photodetector surface 26. Similarly, the photons created in the phosphorescence of the crystal element 12 will all be reflected by striking any face 14, 16, 18, 20, or 22 and those with sufficient kinetic energy to reach emitting face 24 will pass through and strike photodetector surface 26. Therefore, the incident X-radiation is highly amplified as visible radiation at emitting face 24 of element 12. Alternatively, as shown in FIGS. 6 and 8, other faces, such as end face 22, may be used as faces upon which the X-rays impinge to the same end effect.

Since all but one face is a reflector, the geometry of the reflecting faces define the spatial resolution by limiting the spread of visible light produced in the scintillating crystal. As shown in FIG. 6, the highest efficiency conversion can be achieved by matching the dimension "H," that is the face or faces upon which the X-rays impinge, with the width of the beam passing through the subject target. Resolution then can be varied thusly by adjusting the dimensions of each element 12 in an array of elements.

To enhance the internal reflection of the visible radiation photons, it is possible to take advantage of the crystalline properties of elements 12 with respect to the transmission of light therein by creating light barriers 39, as shown in FIG. 8. The light barriers 39 may consist of cleavages in the crystal structure which are air gaps or air gaps filled with some other material having a low index of refraction, such as $MgF_2$ or $NaF_2$ or $CaF_2$. Such cleavages form an interface within the crystal element 12 where a visible radiation photon may experience a total internal reflection. Basically, total internal reflection occurs over a wide range of incidence angles due to the high index, low index of refraction mismatch at the crystal light barrier 39 interface.

As shown in FIG. 8, creating multiple, parallel cleavages in a plane perpendicular to emitting face 24 will, therefore, create "channels" for visible radiation photons created at a scintillation event occurring within the channel. Varying the configuration of such channels provides an alternative method of varying the resolution of the detector elements 12.

Such barriers can be introduced by conventional techniques such as by making incisions (physically or with a laser beam) into the phosphor material or depositing alternate layers of phosphor and low index materials. If a phosphor such as CsI:Tl is extruded through a die, the extrusion could have a shape that assures that adjacent extrusion pieces would not quite fit tightly, thereby creating the requisite gaps. Several extrusion pieces could be combined to construct a single detection element. Simply cutting a phosphor with irregular walls could also create this enhancing effect.

The final image resolution achieved depends on several factors:
(1) the energy spectrum of the X-radiation emitting source,
(2) the detection efficiency of the phosphor type used to form elements 12,
(3) the X-radiation to visible radiation conversion efficiency of the phosphor type used to form the elements 12,
(4) the scan speed of the conventional photodetector selected to be used with the invention,
(5) the afterglow effect of the phosphor type used to form elements 12,
(6) the index of refraction mismatch between the phosphor type used and the photodetector selected to be used with the invention,
(7) the spectral sensitivity of the photodetector selected to be used with the invention, and
(8) the number and configuration of light barriers 39 introduced into each element 12.

For example, the technique taught herein may permit using a scintillating phosphor with a very fast decay time, such as $CdWO_4$ or BGO, which will reduce afterglow effects on the photodetector but which have poor X-ray to visible light conversion efficiencies. Whereas a phosphor with a very efficient conversion factor, such as $Gd_2O_2S:Tb$ (:Eu) or CsI:Tl, has a long afterglow effect. This afterglow becomes the equivalent of a background signal when a line scanning technique is used for photodetection. Hence, the specific design choices for any particular system varies with the image results sought to be achieved.

Where a solid crystal is selected for forming the elements 12 of the converter apparatus 10, phosphors may be selected from the group comprising: $CdWO_4$, BGO, CsI:Tl, CsI:Na, $CaWO_4$, and NaCl:Tl.

Where the converter apparatus 10 is constructed of a crystalline phosphor which is applied directly upon the photodetector light sensitive face 26 by a vapor deposit technique, phosphors may be selected from the group comprising CsI:Tl, CsI:Na, and $CdWO_4$.

Where the converter apparatus 10 is constructed of a granular form crystalline phosphor as a densely packed dry phosphor or with an adhesive for binding the granules together and to the light sensitive face 26 of a photodetector 28, the phosphor may be selected from the group comprising: $Gd_2O_2S:Tb$, $Gd_2O_2S:Eu$, $Y_2O_2S:Tb$, $Y_2O_2S:Eu$, $La_2O_2S:Tb$, and (Zn, Cd)S:Ag.

In order to create either one or two dimensional arrays using crystal vapor deposition or phosphor plus binder deposition or a densely packed phosphor with no binder, it is advantageous to use a mold structure such as shown in FIG. 5, whereby the elements 12 can be formed directly on the light sensitive face 26 of photodetector 28. A mold 40 is constructed with walls 44, 46, and element separating barriers 48 constructed of a thin material, such as a glass fiber. Mold walls 44 and 46 in conjunction with surfaces 50 and 52 of barriers 48 create gaps 54 dimensioned such that the photosensitive face(s) 26 of a photo-detector 28 can be mated to the mold gap 54. Inner surfaces 56 of mold walls 44, 46 and surfaces 50 and 52 of barriers 48 are coated with the thin, visible radiation reflecting film 13 having the polish facing gaps 54. Hence, when the mold is filled with the crystalline phosphor, or phosphor granules and binder, or simply densley packed dry phosphor granules, the face(s) 24 of the scintillator 10 are bonded or in contact directly to face(s) 26 of correspondingly arrayed photodetectors 28. End face(s) 22 are cut or beveled off the top of mold 40 and then also coated with reflective film in order to complete the embodiment of FIG. 4.

Such a configuration as shown in FIG. 4 is useful in an adaptation where an array of discrete photodetectors with dead spaces between each photodetector light sensitive face is being used. The beveled faces 58, 60 of elements 12 are formed by walls 50, 52 and permit the entire surface area presented to the X-ray beam to be used while constricting the visible radiation output to the useful photosensitive faces of such an array of photodetectors.

By this same manner of using beveled crystals, a continuous detector can be made to appear to be discrete in one or two dimension, viz. the visible radiation output from the phosphor onto the photosensitive face of a detector can be concentrated in discrete lines or rectangles. As shown in FIG. 8, this result can also be achieved using a single photodetector 28 with discrete elements 12.

Moreover, this technique of beveling certain faces of each element 12 can also be used to improve the phosphorescent output efficiency by changing the angles of reflection from the inner, reflective coated surfaces of the crystals as shown in FIGS. 6 and 7.

In an alternative construction, the invention disclosed can be used for conventional detection as described above and also for multi-energy imaging, useful for example, for polychromatic X-radiation studies. As shown in FIGS. 9 and 10, two or more crystal elements 62, 64 are mounted one below the other relative to the incident X-radiation 30. Optical isolation is maintained between each crystal element 62, 64, 66, 68, 70, coupled to individual photodetectors 72, 74, 76, 78, 80, respectively. An incident X-ray is attenuated and filtered by each succeeding crystal element. That portion of the X-ray flux reaching the next lower successive crystal has a different spectral energy distribution than the original incident X-radiation. Hence, spatial resolution in such an embodiment can be orchestrated by the phosphor types and shapes chosen. This imaging format, therefore, makes use of the different energies of the incident X-rays to gain more information about the tissue composition in diagnostic radiology. By using this embodiment, only one exposure is required, representing both a reduction in patient dosage and avoidance of problems related to patient motion between exposures in a conventional multi-exposure technique.

It is readily apparent that by manipulating the phosphors and photodetectors, systems can be developed which provide varying phosphor path lengths, which vary the X-rays' stopping ability, and which remove the photodetectors from the direct X-ray beam.

In the foregoing description of the present invention, a preferred embodiment of the invention has been disclosed. It is to be understood that other design variations are within the scope of the present invention.

What is claimed is:

1. An apparatus for converting incident X-radiation to visible radiation comprising:
   crystalline means for scintillating visible radiation in response to said incident X-radiation; and
   reflection means, disposed exteriorly on a portion of said crystalline means, for internally reflecting said visible radiation within said crystalline means,
   whereby said visible radiation is emitted by said apparatus from the portion of said crystalline means not having said exteriorly disposed reflection means.

2. An apparatus as defined in claim 1, wherein said crystalline means comprises:
   a solid crystal phosphorescent element.

3. An apparatus as defined in claim 2, wherein said crystal phosphorescent element is selected from the group comprising: $CdWO_4$, BGO, CsI:Tl, CsI:Na, $CaWO_4$, NaCl:Tl.

4. An apparatus as defined in claim 1, wherein said crystalline means comprises:
   a vapor-deposited, crystal phosphorescent element.

5. An apparatus as defined in claim 4, wherein said crystal phosphorescent element is selected from the group compising: CsI:Tl, CsI:Na, $CdWO_4$.

6. An apparatus as defined in claim 1, wherein said crystalline means comprises:
   a plurality of granular phosphorescent crystals; and
   means for binding the granules together.

7. An apparatus as defined in claim 6, wherein said plurality of granular crystals is selected from the group comprising: $Gd_2O_2S:Tb$, $Gd_2O_2S:Eu$, $Y_2O_2S:Tb$, $Y_2O_2S:Eu$, $La_2O_2S:Tb$, (Zn, Cd)S:Ag.

8. An apparatus as defined in claim 1, wherein said crystalline means is in the shape of a polyhedron.

9. An apparatus as defined in claim 1, wherein said crystalline means is in the shape of a prism.

10. An apparatus as defined in claim 1, wherein said crystalline means is in the shape of a parallelepiped.

11. An apparatus as defined in claims 8, 9, or 10, wherein said reflection means is disposed upon each surface of said shaped crystalline means except one surface, whereby said visible radiation is emitted only by said one surface.

12. An apparatus as defined in claim 11, wherein said reflection means comprises:
an X-radiation transparent, thin film means which is reflective of visible radiation.

13. An apparatus as defined in claim 12, wherein said thin film means is composed of an aluminum or silver compound.

14. An apparatus as defined in claim 12, wherein said reflection means comprises:
a thin film means composed of a material having a low index of refraction.

15. An apparatus as defined in claim 14, wherein said material comprises:
$MgF_2$ or $NaF_2$ or $CaF_2$.

16. An apparatus as defined in claim 12, wherein said air gap is filled with a material having a low index of refraction.

17. An apparatus as defined in claim 11, wherein said light barrier means comprises:
at least two wall means, oriented in planes generally perpendicular to said portion where visible radiation is emitted, for forming an air gap in said crystalline means.

18. An apparatus as defined in claim 1, further comprising:
light barrier means, disposed within said crystalline means, for channelling said visible radiation to said portion of said crystalline means not having said exteriorly disposed reflection means.

19. An apparatus for converting X-radiation to visible radiation comprising:
a plurality of X-radiation sensitive phosphorescent means, each having a plurality of faces, for intercepting incident X-radiation and for producing visible radiation in response thereto; and
reflecting means, disposed on all except one of said faces of each of said phosphorescent means, for internally reflecting said visible radiation,
whereby, when said phosphorescent means are disposed in an array in which said face not having said reflection means of each of said phosphorescent means are made continguous, said visible radiation is internally reflected and emitted from only one surface of the array formed by said continguous faces.

20. An apparatus as defined in claim 19, wherein said array of elements is disposed in two-dimensions.

* * * * *

UNITED STATES PATENT AND TRADEMARK OFFICE
CERTIFICATE OF CORRECTION

PATENT NO. : 4,560,882
DATED : December 24, 1985
INVENTOR(S) : Robert S. Nelson and Zoran L. Barbaric It is certified that error appears in the above-identified patent and that said Letters Patent are hereby corrected as shown below:

On the Cover Sheet:

The designation of the inventors should read:

--Nelson et al.; and

In the "Inventors" Segment:

--Inventors: Robert S. Nelson, Santa Monica; Zoran L. Barbaric, Malibu, both of Calif.--.

In the Specification:

At column 4, line 20, delete "$NaF_2$" and insert therefor --NaF--;

At column 7, line 24, in claim 15, delete "$NaF_2$" and insert therefor --NaF--.

Signed and Sealed this

Seventeenth Day of June 1986

[SEAL]

Attest:

DONALD J. QUIGG

Attesting Officer  Commissioner of Patents and Trademarks